United States Patent Office 3,306,869
Patented Feb. 28, 1967

3,306,869
FLOOR POLISHES CONTAINING SILOXANE-OXY-ALKYLENE BLOCK COPOLYMER LEVELING AGENTS
Paul H. Lahr, South Salem, and Lewis M. Shepard, Yorktown Heights, N.Y., assignors to Union Carbide Corporation, a corporation of New York
No Drawing. Filed Sept. 22, 1965, Ser. No. 489,394
5 Claims. (Cl. 260—24)

This application is a continuation-in-part of U.S. Serial No. 308,098, filed September 11, 1963, now abandoned.

This invention relates to floor polish formulations. More particularly, this invention relates to emulsion-type floor polish formulations.

Typical polish formulations of this type comprise a wax at least part of which is carnauba wax, a solid resinous material, an organic acid, and an emulsifier. Upon application the polish dries to a shine without rubbing and buffing, and for this reason such polishes are favored by the consumers. In formulations of this type it is important to minimize, and preferably obviate, the beading of the polish on the applied surfaces, i.e., to promote "leveling" of the polish so as to assure a uniform film of polish on the applied surface.

When synthetic waxes, such as modified polyolefin wax, are employed in the formulations, the leveling of the applied polish is not very good. Yet these waxes are very desirable from the standpoint of durability, buffability, and scuff-resistance.

It is a primary object of this invention to provide a modified synthetic wax formulation having very good leveling properties.

It is a further object to provide a modified polyolefin wax-based polish formulation having very good leveling properties, buffability, durability, and scuff-resistance.

Still other objects will become apparent upon refrence to the ensuing specification and claims.

The foregoing objects are achieved by a basic aqueous emulsion containing a wax, the major portion of which is modified polyolefin wax, a modified rosin which is insoluble in water but soluble in basic aqueous solution, a compatible emulsifying agent, and a hydrolytically-stable polysiloxane-oxyalkylene block copolymer having a molecular weight below about 25,000 and a polysiloxane content in the range from about 30 to about 60 percent by weight.

The major portion of the wax component in the emulsion must be modified polyolefin wax. Preferably at least about 80 percent by weight of the total wax content is modified polyolefin wax. The remainder of the wax can be natural or synthetic waxes, or mixtures thereof. The particular natural or synthetic waxes used must of course be emulsifiable in accordance with the practice of the invention.

The term "polyolefin" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation such as is present for example in carbon monoxide and formaldehyde and in compounds containing the ethylenic unsaturation (viz. $>C=C<$), e.g. styrene, vinyl stearate, butene, vinyl acetate, vinyl formate, methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred polyolefins in this invention contain at least 50 percent by weight of a combined alpha-mono-olefinically unsaturated hydrocarbon having from 2 to 4 carbon atoms inclusive, i.e. butene-1, propylene and especially ethylene.

The term "modified polyolefin wax" refers to low molecular weight polyolefin waxes, e.g., molecular weights from about 1000 to about 5000, which have been reacted with a carboxylic reagent as defined below. The method of preparation of the carboxylic reagent modified polyolefin waxes used in the present invention is in no ways critical. For example, these waxes can be prepared, in general by reaction of a carboxylic reagent with a low molecular weight polymer polymerized directly to that weight, or a low molecular weight polymer for modification can be obtained by the pyrolysis or thermal degradation of a high molecular weight polyolefin, e.g. a polyethylene having a density of from 0.88 to 0.97 and higher. Preferably a polyethylene to be pyrolyzed is substantially linear and has a density of 0.94 to 0.97 as the higher density polyethylene pyrolysis products provide the best adhesion after modification. The pyrolysis is conveniently carried out in a heated pyrolysis tube at about 450°–600° C. but can be effected in any known manner. The resulting waxes range in molecular weight from about 1000 to about 5000, and preferably from 1500 to 5000.

In a preferred method of preparing the preferred modified polyethylene waxes, a polyethylene wax having a density above about 0.94 and a molecular weight of from about 1500 to 5000 is blended in the liquid phase, i.e., in the melt or in solution with from 1 to 25 percent by weight of a carboxylic reagent, e.g. maleic anhydride, and reacted by being agitated therewith at temperatures of from about 130° C. to about 250° C. and preferably above 180° C. With lower density polyethylenes reaction temperatures of 80° C. and above are suitable. The blending and agitation can be carried out in any manner which insures intimate commingling of the reactants and good heat transfer throughout the reaction mass during the reaction time. For example, the polyethylene wax can be dissolved in an inert liquid organic solvent for the wax and carboxylic reagent such as toluene, xylene, cyclohexane, methylcyclohexane, iso-octane and chlorinated hydrocarbon solvents such as ortho-dichlorobenzene, 1,1,2-trichloroethane and α-chloronaphthalene. The dissolving of the polyethylene wax is most conveniently accomplished at temperatures above 110° C. in aromatic solvents for higher density polyethylenes.

It is preferred to effect reaction in the melt in the absence of an organic solvent by heating a high density polyethylene wax to its melting point (ca. 130° C.) and above, e.g. to 180° C. and stirring in from 5 to 15 percent, based on the wax, of carboxylic reagent, e.g. maleic anhydride and continuing heating for 60–90 minutes. Temperatures of reaction either in solution or in the melt above about 250° C. confer no added benefit in speed of reaction or quality of modified wax obtained and, hence, will not be ordinarily used. The modification reaction can be effected under pressure to prevent undue volatilization of carboxylic reagent. The viscosity of the melted polyethylene waxes, e.g., 250–1000 centipoises at 200° C., is such that rapid stirring of the carboxylic reagent is easily accomplished. The exact manner or order of addition of the reactants is not critical. Any excess carboxylic reagent is removed after the reaction as by vacuum distillation or like technique.

The term "carboxylic reagent" as used herein refers to an organic compound containing at least one carboxyl group selected from the group consisting of (1) alpha-beta-unsaturated monocarboxylic acids having from 3 to 6 carbon atoms, as for example, acrylic acid, crotonic acid, sorbic acid and the like; (2) ethylenically unsaturated dicarboxylic acids having from 4 to 18 carbon atoms, as for example maleic acid, tetrahydrophthalic acid, fumaric acid, glutaconic acid, itaconic acid and the like; (3) mercapto carboxylic acids having from 2 to 10 carbon atoms, as for example, 2-mercapto acetic acid (commonly called thioglycolic acid), 3-mercapto propionic acid, 4-mercapto butyric acid, 2-mercapto succinic acid, 2-mercapto adipic acid, and the like, (4) anhydrides of the foregoing acids, for example, maleic anhydride and the like, and (5) esters of the foregoing acids, for example the ethyl ester of thioglycolic acid and the like. All of these carboxylic reagents are capable of undergoing an addition reaction to one or more olefinic linkages occurring in polyethylene waxes.

The above modified polyolefin waxes preferably have a melting point of about 115° C. to about 130° C. and an acid number of about 10 to about 40. A maleic acid-polyethylene wax having a molecular weight of about 3000, a melting point of about 125° C., and an acid number of 35 is particularly desirable. Acid number is a measure of free acid in the wax and is determined by the number of milligrams of KOH used to neutralize one gram of wax.

Rosin is a solid, resinous material obtained from oleoresin or stump wood of pine trees and contains chiefly rosin acids. The term "modified rosin" as used herein and in the appended claims, refers to rosin that has been subjected to alcohol or acid treatments which alter the nuclear configuration of the rosin acids. The resultant product is normally a mixture of esterified rosin and rosin acids. The modified rosin is insoluble in water but soluble in basic aqueous solutions such as an ammonia solution. In the instant formulation the modified rosin serves as a filler, as an adhesive for the wax, and also acids emulsification.

The modified rosins contemplated herein may be produced by the interreaction of conventional and natural occurring rosin with alcohols, such as alkanols, alkane diols, alkane triols, alkane tetrols, etc., which may be specifically illustrated by the following: methanol, ethanol, n-propanol, isopropanol, n-butanol, t.-butanol, 2-butanol, 2-ethyl-1-hexanol, ethylene glycol, 1,2-propylene glycol, glycerine, pentaerythritol, erythritol, 1,2,6-hexane triol, diethylene glycol, dipropylene glycol, glucose, and the like. Such reactions can be effected by heating the rosin and the alcohol together at a temperature below the boiling point of the alcohol, typically at a temperature of at least 50° C., until esterification is accomplished. The esterification reaction may be speeded up by the incorporation of an acid or basic catalyst to the reaction. Usable catalysts include mineral acids such as hydrochloric acid, sulfuric acid, boric acid, and the like, or alkaline catalysts such as sodium hydroxide, potassium hydroxide, sodium bicarbonate, sodium carbonate, lithium hydroxide, cesium hydroxide, ammonia, quaternary ammonium hydroxide, and the like. Other catalysts which are suitably employed are the known organic metallic catalysts or metal salts such as stannous octoate, stannic chloride, lead naphthenate, cobalt octoate, ferric chloride, aluminum chloride and the like. Also usable as a catalyst are the strong acidic non-metallic salts such as boron trifluoride, and the like. These catalysts may be employed in the esterification reaction in amounts ranging from as low as about 10 parts per million up to 5 weight percent, based on the weight of the reactants charged.

Another useable class of modified rosin is that formed by the Diels-Alder addition reaction of rosin acids with maleic anhydride. This may be accomplished by mixing the rosin acids with maleic anhydride at elevated temperature, viz, a temperature typically exceeding about 75° C., preferably at a temperature exceeding about 150° C. The resulting adduct may then be interreacted with an alcohol or other fatty acids for further modification. The chemistry involved here is well known and forms no part of the instant invention.

The emulsifying agents contemplated can be either non-ionic or anionic. This broad group of compounds is classified in three distinct categories—cationic, non-ionic, and anionic emulsifiers. The non-ionic emulsifiers do not ionize in water and are long molecules which on one end are hydrophilic and lipophobic and on the other end hydrophobic and lipophilic. The cationic emulsifiers and the anionic emulsifiers ionize in water providing charged ions of long molecular structure. In cationic surfactants the lipophilic-hydrophobic end is on the positively charged cation and in anionic surfactants the lipophilic-hydrophobic end is on the negatively charged anion.

Compatible emulsifiers for the present formulation are those of the non-ionic and anionic type. Because the formulation is alkaline, the cationic emulsifiers are not usually suitable.

The non-ionic emulsifiers contemplated herein are organic compounds of a relatively high molecular weight and consisting of a hydrophobic portion to which is attached a solubilizing or hydrophilic portion containing groups such as ether links (—C—O—C—), hydroxyl groups (—OH), carbonyloxy groups

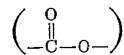

and the like.

Specifically contemplated within the above definition are surfactants having as the hydrophilic moiety one or more chains containing one or more alkyleneoxy groups. These surfactants have the general formula

wherein R is alkoxy, i.e., the hydrophobic portion of an aliphatic alcohol containing from about 8 to about 22 carbon atoms or an alkylated phenyloxy containing from about 4 to about 22 carbon atoms in the alkyl group thereof, Y is an alkyleneoxy chain, H is a hydrogen atom bonded to an oxygen atom of the alkyleneoxy chain, and y is an integer from 1 to about 6, and preferably from 1 to 4.

Typical aliphatic alcohols are octyl alcohol, nonyl alcohol, decyl alcohol, "coco" alcohol (a mixture of $C_{10}$ to $C_{16}$ alcohols), dodecyl alcohol, oleyl alcohol, tallow alcohol (a mixture of $C_{16}$ to $C_{18}$ alcohols), octadecyl alcohol, 2,6,8-trimethyl-4-nonyl alcohol, and the like.

Typical alkylated phenols are butylphenol, pentylphenol, hexylphenol, octylphenol, nonylphenol, dodecylphenol, hexadecylphenol, octadecylphenol, nonadecylphenol, and the like.

By the term "alkyleneoxy chain" as used herein and in the appended claims is meant a chain containing one or more alkyleneoxy groups which are divalent alkylene groups such as methylene, ethylene, propylene, butylene, and the like, bonded to an oxygen atom in a manner such that one of the valences of the alkyleneoxy group is from an oxygen atom and the other is from a carbon atom. Typical alkyleneoxy groups are methyleneoxy (—$CH_2O$—), ethyleneoxy (—$C_2H_4O$—), propyleneoxy (—$C_3H_6O$—), butyleneoxy (—$C_4H_8O$—), and the like.

Preferred non-ionic surfactants for the instant formulations are the polyalkylene glycol ethers containing from about 4 to about 80 moles of alkylene oxide. Illustrative preferred non-ionic surfactants are the nonylphenyl polyethylene glycol ethers containing about 4 ethylene oxide groups, the trimethylnonyl polyethylene glycol ethers containing about 6 ethylene oxide groups, the nonylphenyl polyethylene glycol ethers containing about 7 ethylene oxide groups, mixed polyalkylene glycol ethers containing about 60 groups of a mixture of ethylene oxide and 1,2-propylene oxide in a mole ratio of about 2:1, and the like.

The anionic emulsifiers contemplated herein are amine soaps, and the like. These soaps are formed by the reaction of an amine with a fatty acid in about stoichiometric amounts and at room temperature or at a slightly elevated temperature. Amine soaps are the preferred emulsifiers for the present invention since water-spotting is thereby minimized. Particularly preferred is morpholine oleate. Other suitable amine soaps are triethanolamine stearate, triethanolamine oleate, triethanolamine coconut oil soap, isopropanolamine oleate, N,N-dimethylethanolamine oleate, and the like.

A very important constituent of the instant formulation is the leveling agent. As used herein and in the appended claims the term "leveling agent" is taken to mean an additive which improves the wetting of hydrophobic surfaces, promotes flow, decrease beading, ridges, or thin spots during application of the polish, and/or aids in the prevention of coagulation of solids or gelation of the polish.

Now it has been found that hydrolytically-stable polysiloxane-oxyalkylene block copolymers having a molecular weight below about 25,000 are surprisingly well suited for this purpose. These block copolymers must be water-insoluble, yet they must be water-dispersible. The block copolymers are deemed to be water-insoluble if 1 weight percent of the copolymer does not yield a clear solution in water at about 25° C.

The polysiloxane content in the aforesaid polysiloxane-oxyalkylene block copolymers that are suitable for the instant formulations is in the range from about 30 percent by weight to about 60 percent by weight. Copolymers containing less than about 30 percent polysiloxane are water-soluble and thus unsuitable. If the polysiloxane content is greater than about 60 percent by weight, the presence of the copolymer in the formulation results in the crazing of the deposited wax film once it is dry.

The leveling agents contain at least two siloxane units that are represented by the formula $$R_bSiO_{4-b/2}$$

wherein R can be a monovalent hydrocarbon group, a halo-substituted monovalent hydrocarbon group, or a divalent hydrocarbon group, and $b$ is an integer in the range from 1 to 3. Each R can contain from about one to about twenty carbon atoms. The hydrocarbon groups represented by R can be alike or different throughout the siloxane block of the polymer and, similarly, the value of $b$ can be the same or different. The divalent hydrocarbon groups represented by R link the siloxane block to the oxyalkylene block present in the copolymer. Each siloxane block contains at least one unit represented by the above formula having a divalent hydrocarbon group.

Illustrative of the monovalent hydrocarbon groups that are present in the above formula are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl and terphenyl groups); the aralkyl groups (for example, the benzyl and the phenylethyl groups); the alkaryl groups (for example, the styryl, tolyl and n-hexylphenyl groups); and the cycloalkyl groups (for example, the cyclohexyl group).

Illustrative of the halogen-substituted monovalent hydrocarbon groups are the chloromethyl, trichloroethyl, perfluorovinyl, parabromobenzyl, iodophenyl, alpha-chloro-beta-phenylethyl, para-chlorotolyl, bromocyclohexyl, and the like.

Illustrative divalent hydrocarbon groups are the alkylene groups (such as the methylene, ethylene, propylene, butylene, 2,2-methyl-1,3-propylene, decylene and eicosylene groups), the arylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

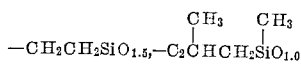

and

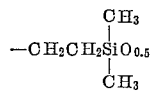

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane units that are represented by the above formula wherein either the same hydrocarbon groups are attached to a silicon atom (e.g., the dimethylsiloxy, diphenylsiloxy and diethylsiloxy groups) or different hydrocarbon groups are attached to a silicon atom (e.g., the methylphenylsiloxy, phenylethylmethylsiloxy and ethylvinylsiloxy groups).

The siloxane block in the block copolymers useful in this invention can contain one or more types of siloxane units that are represented by the aforesaid formula provided that at least one group has at least one divalent hydrocarbon substitutent. By way of illustration, ethylenemethylsiloxy groups

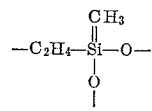

can be present in the siloxane block, or the siloxane block can contain more than one type of siloxane group, e.g., the block can contain both ethylene methylsiloxy groups and diphenylsiloxy groups, or the block can contain ethylenemethylsiloxy groups, diphenylsiloxy groups and diethylsiloxy groups.

The siloxane block contained in the block copolymers useful in this invention can also contain trifunctional siloxane units (e.g., monomethylsiloxane groups, $$CH_3SiO_{1.5})$$

difunctional siloxane groups [e.g. dimethylsiloxane groups, $(CH_3)_2SiO_{1.0}$] monofunctional siloxane units e.g., trimethylsiloxane units, $(CH_3)_3SiO_{0.5}$, or combinations of these types of siloxane units having the same or different substituents. Due to the functionality of the siloxane groups, the siloxane block can be predominately linear or cyclic or crosslinked or it can have combinations of these structures.

The siloxane block contained in the block copolymers can also contain other end-blocking or chain terminating groups as well as the mono-functional siloxane chain terminating groups. By way of illustration, the siloxane block can contain such end-blocking groups as the hydroxyl group, the aryloxy groups (such as the phenoxy group), the alkoxy groups (such as the methoxy, ethoxy, propoxy, and butoxy groups), the acyloxy groups such as the acetoxy group, and the like.

The siloxane blocks in the block copolymers useful in this invention each contain at least two siloxane units. Preferably, the soloxane blocks contain a total of at least five siloxane units of the type shown above. That part of the average molecular weight of the copolymer that is attributable to the siloxane blocks can be as high as about 10,000.

The oxyalkylene blocks in the block copolymers useful in the present formulations each contain at least one oxyalkylene group represented by the formula

—R"—O— wherein R" is an alkylene group. Preferably, the alkylene group represented by R" contains from two to about ten carbon atoms, and most preferably from two to three carbon atoms. Illustrative oxyalkylene groups are the oxyethylene, oxy-1,2-propylene, oxy-1,3-propylene, oxy-2,2-dimethyl-1,3-propylene, oxy-1,10-decylene groups, and the like.

The oxyalkylene blocks in the block copolymer can contain one or more of the various types of oxyalkylene groups hereinabove represented. By way of illustration, the oxyalkylene blocks can contain only oxyethylene groups or only oxypropylene groups, or both oxypropylene groups and oxyethylene groups, or other combinations of the various types of oxyalkylene groups.

The oxyalkylene blocks in the block copolymers useful in this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also a single group can serve as an end-blocking group for more than one oxyalkylene block. For example, the glyceroxy group $$\begin{matrix} CH_2 & CH & CH_2 \\ | & | & | \\ O & O & O \\ | & | & | \end{matrix}$$

can serve as an end-blocking group for three oxyalkylene chains.

The oxyalkylene blocks in the block copolymers contemplated herein each contain at least one oxyalkylene group. Preferably, each block contains at least two such groups. That part of the average molecular weight of the copolymer that is attributable to the oxyalkylene blocks can be as high as about 15,000.

The copolymer can contain, for example, from about 30 parts by weight up to about 60 parts by weight of siloxane blocks and from about 40 parts by weight to about 70 parts by weight of oxyalkylene block per 100 parts by weight of the copolymer. Preferably, the copolymer contains from about 35 parts by weight to about 50 parts by weight of the siloxane blocks and from about 50 parts by weight to about 65 parts by weight of the oxyalkylene blocks per 100 parts by weight of the copolymer.

The block copolymer useful in this invention can contain more than one of each of the blocks and the blocks can be arranged in various configurations such as linear, cyclic or branched configurations. The term "block copolymers" is intended herein and in the claims to include graft copolymers, and the like.

Illustrative leveling agents within the purview of the foregoing description are:

Me$_3$SiO(Me$_2$SiO)$_{2.0}$[MeO(C$_2$H$_4$O)$_3$C$_3$H$_6$SiMeO]$_{2.8}$SiMe$_3$ (A)

Me$_3$SiO(Me$_2$SiO)$_{2.0}$[MeO(C$_2$H$_4$O)$_3$C$_2$H$_4$SiMeO]$_{2.8}$SiMe$_3$ (B)

Me$_3$SiO(Me$_2$SiO)$_{8.5}$[MeO(C$_2$H$_4$O)$_7$C$_3$H$_6$SiMeO]$_{1.8}$[MeO(C$_2$H$_4$O)$_3$C$_3$H$_6$SiMeO]$_{1.8}$SiMe$_3$ (C)

Me$_3$SiO[MeO(C$_2$H$_4$O)$_3$C$_3$H$_6$SiMeO]$_2$SiMe$_3$ (D)

NOTE.—In the above formulae Me=CH$_3$—.

The polysiloxane-oxyalkylene block copolymers that are useful as leveling agents in the instant formulations can be prepared by two convenient methods. The first method, known as the metathesis process, involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process is illustrated by the following equation:

Siloxane—OSiR$^2$X + MO—Oxyalkylene ⟶

Siloxane—OSiR$^2$O—Oxyalkylene + MX wherein R$^2$ is a divalent hydrocarbon group, X is a halogen atom, M is an alkali metal, Siloxane denotes a siloxane block and Oxyalkylene denotes an oxyalkylene block.

The second method, known as the addition process, involves forming a mixture of a siloxane polymer containing a hydrogen-siloxy group (i.e., a HSiO— group), an oxyalkylene polymer containing alkenyloxy end-blocking or chain terminating group and a platinum catalyst, and heating the mixture to a temperature sufficiently elevated to cause the siloxane polymer and the oxyalkylene polymer to react to produce the copolymer. This process can be illustrated by the following equation:

Oxyalkylene—OR$^3$ + HSiO—Siloxane ⟶

Oxyalkylene—O R$^4$SiO—Siloxane wherein Oxyalkylene and Siloxane have the same meaning as that defined in the formula immediately preceding, OR$^3$ is an alkenyloxy group (such as the vinyloxy and the allyloxy groups) and R$^4$ is an alkylene group containing at least two successive carbon atoms.

The floor polish formulations of this invention can be characterized as basic water emulsions containing from about 12 to about 18 percent by weight solids. Of the solids contained in the emulsion, from about 50 to about 80 percent by weight is an emulsifiable wax, and at least about 80 percent by weight of the emulsifiable wax is the aforesaid modified polyethylene wax. The solids content of the polish formulation is typified by the following:

| Component | Amount, Parts by Weight | |
|---|---|---|
| | Overall Range | Preferred Amount |
| Modified polyethylene wax | 100 | 100 |
| Natural waxes | Up to 25 | 0 |
| Modified rosin | 15–30 | 18–23 |
| Anionic emulsifying agent | 15–30 | 20–25 |
| Base | 3–8 | 3–8 |
| Leveling agent: | | |
|   Polysiloxane-oxyalkylene block copolymer | 1.5–5 | 1.5–4 |
|   Ammonium acetate | Up to 2 | 1.5–2 |
|   Anionic wetting agent | Up to 0.4 | 0.15–0.25 |
| Odor masking agents | Up to 2 | 0.1–0.2 |

In the formulation it is desirable to employ at least about 1.5 parts by weight of the polysiloxane-oxyalkylene block copolymer for every 100 parts by weight of the modified polyethylene wax. When using only this leveling agent, optimum leveling has been obtained when about 2 to 4 parts by weight of the polysiloxane-oxyalkylene block copolymer are used for every 100 parts by weight of the modified polyethylene wax.

It has been found, however, that the amount of the aforesaid block copolymer necessary for optimum results can be decreased somewhat by the replacement of a part of that amount by ammonium acetate or similar other volatile electrolytes including compounds such as methyl formate and ethyl acetate which hydrolyze in water to form volatile electrolytes. Part of the block copolymer can also be replaced by an anionic wetting agent such as the bis(tridecyl) ester of sodium sulfosuccinic acid.

Since it is necessary that the formulation is basic, a base is added in an amount sufficient to maintain the pH of the resulting emulsion in the range from about 8 to about 9. A pH in the range from about 8 to about 8.7 is preferred since an emulsion having a lower pH may become cloudy. A pH greater than about 9 is generally undesirable since at such pH's there is the possibility of extensive attack on wax coats already present on the surface to be polished.

The desired level of basicity is achieved by adding to the formulation inorganic or organic bases such as ammonium hydroxide or morpholine. Preferred for this purpose is a mixture of concentrated (about 14.8 M)

ammonium hydroxide solution and morpholine in a weight ratio of about 1:2, respectively.

Since the polish formulation has a faint soapy-amine odor, it is sometimes deemed desirable to add an odor-masking agent. A myriad of compounds is suitable for this purpose and such compounds are well known in the art. The addition of such a compound to the instant formulations is optional.

A particular preferred formulation has been prepared from the following ingredients.

| Component: | Amounts, parts by wt. |
|---|---|
| Maleic anhydride-modified polyethylene wax | 100 |
| Esterified natural rosin[1] | 22.5 |
| Oleic acid | 17 |
| Morpholine | 10 |
| $NH_4OH$ | 5 |
| A dimethylsiloxane-polyoxyethyl copolymer (composition (A) column 7) | 1.8 |
| Ammonium acetate | 1.8 |
| Bis(tridecyl) ester of sodium sulfosuccinic acid | 0.2 |
| Water | 774.0 |
| Odor masking agent | 0.1–0.2 |

[1] The esterified natural rosin is formed by the reaction of gum rosin with pentaerythritol in the presence of 0.5 weight percent zinc chloride at a temperature of 250° C. under an inert super atmosphere. It had the following properties: melting point 168–178° C.; acid No. 125–135; color (Gardner) 9–11; and is soluble in basic aqueous solution such as an ammonia solution.

The long term performance of this polish formulation was evaluated by determining the hardness of the deposited film, buffability, ease of removal, resistance to water-spotting, resistance to dirt pick-up, and resistance to slip-, scuff-, and heel-marks. In addition, the initial appearance of the polish upon application was observed, and factors such as gloss, leveling, the occurrence of "fish-eyes" (small, circular dull spots on the polish film), occurrence of foam spots, coatability over deposits of strong detergents, and recoatability. Also considered were factors such as color, clarity, odor, alkalinity, and the solids content.

In all of the above respects it was found that this formulation rated very highly in comparison to other presently commercially available formulations. Moreover, the instant formulations are suitable for all types of surfaces including linoleum, asphalt, vinyl, wood, vinyl-asbestos, and the like.

The formulation can be conveniently prepared using inversion emulsification techniques in a pressure vessel. In general, the emulsification process comprises admixing the wax, the emulsifying agent and water at room temperature and thereafter heating the resulting mixture in a pressure vessel up to at least the melting point of the wax under autogeneous pressure, or above, stirring the mixture during heating, admixing additional amounts of water to obtain the desired solids content, and then cooling the resulting formulation.

While the wax may be emulsified separately and thereafter the remainder of the constituents added, the preferred procedure is to co-emulsify the wax and the modified rosin, admix the remainder of the constituents in a separate vessel, and then combine the two resulting liquids while stirring. Thorough mixing during the foregoing addition step is important to insure homogeneity of the final product.

Though the above description has been specific regarding the components thereof, it is to be appreciated that many of the components can be substituted for by conventionally available materials which are comparable in properties and use. For example, this invention can be effected with a broad variety of modified rosins. Thus, this invention is not critical to the selection of any one specific type of modified rosin and includes, within its purview, any modified rosin which possesses solubility in a basic aqueous solution. For this reason, the term modified rosin, as employed herein and in the claims, includes any rosin derived from natural sources which has been modified chemically by interreaction with other materials. This includes, for example, the modified oil-soluble phenoplasts which can be made by adding to the hot natural rosin either a phenolformaldehyde condensation product or the phenol and formaldehyde separately in which case condensation occurs during the heating up of the components. These phenoplasts may be further modified with glycerol or pentaerythritol through esterification with methanol phenol and/or the rosin acid ester component in the phenoplasts.

The foregoing discussion and examples are intended as illustrative. Other variations and modifications within the spirit and scope of this invention will readily present themselves to the skilled artisan.

What is claimed is:

1. A floor polish formulation comprising a basic aqueous emulsion of an emulsifiable wax, at least 80 percent of which is a modified polyolefin wax having a molecular weight in the range from about 1000 to about 5000, said polyolefin wax being modified by reaction with a compound containing at least one carboxyl group selected from the group consisting of alpha-beta-unsaturated monocarboxylic acids having from 3 to 6 carbon atoms, ethylenically unsaturated dicarboxylic acids having from 4 to 18 carbon atoms, mercapto carboxylic acids having from 2 to 10 carbon atoms, anhydrides of the foregoing acids and esters of the foregoing acids, a modified rosin insoluble in water but soluble in basic aqueous solutions, said rosin being modified by reaction with a compound selected from the group consisting of alcohols, polyols and maleic anhydride, a compatible emulsifying agent selected from the group consisting of non-ionic surfactants containing 4 to about 80 moles of an alkylene oxy group and anionic surfactants of amine soaps, and a polysiloxane-oxyalkylene polymer having a molecular weight below about 25,000, a polysiloxane content in the range from about 30 to about 60 percent by weight and being insoluble in water in concentrations greater than one percent at 25° C.

2. A floor polish formulation as defined by claim 1 wherein the emulsifiable wax is a maleic anhydride-modified polyolefin wax having a molecular weight in the range from about 1000 to about 5000.

3. A floor polish formulation as defined by claim 2 wherein the basic aqueous emulsion has a pH in the range from about 8 to about 9.

4. A floor polish formulation comprising a basic aqueous emulsion containing from about 12 to about 18 percent by weight solids and consisting essentially of about 100 parts by weight of a maleic anhydride-modified polyethylene wax having a molecular weight in the range from about 1000 to about 5000, a melting point in the range from about 115° C. to about 130° C. and an acid number in the range from about 10 to about 40; up to about 25 parts by weight of a natural wax; from about 15 to about 30 parts by weight of a modified rosin insoluble in water but soluble in basic aqueous solution, said rosin being modified by reaction with a compound selected from the group consisting of alcohols, polyols and maleic anhydride; from about 20 to about 30 parts by weight of an anionic emulsifying agent of an amine soap; from about 3 to about 8 parts by weight of an amine base selected from the group consisting of ammonium hydroxide and morpholine; from about 1.5 to about 5 parts by weight of a hydrolytically-stable polysiloxane-oxyalkylene block copolymer having a molecular weight below about 25,000, a polysiloxane content in the range from about 30 to about 60 percent by weight and being insoluble in water in concentrations greater than one percent at 25° C.; up to about 0.4 part by weight of an anionic wetting agent; and water.

5. A floor polish formulation comprising a basic aqueous emulsion containing from about 12 to about 18 percent by weight solids, having a pH in the range from about 8 to about 8.7, and consisting essentially of about 100 parts by weight of a maleic anhydride-modified polyethylene wax having a molecular weight in the range from about 1000 to about 5000, a melting point in the range from about 115° C. to about 130° C., and an acid number in the range from about 10 to about 40; from about 18 to about 23 parts by weight of a modified natural rosin insoluble in water but soluble in basic aqueous solution, said rosin being modified by reaction with a compound selected from the group consisting of alcohols, polyols and maleic anhydride; from about 20 to about 25 parts by weight of an anionic emulsifying agent of an amine soap; from about 3 to about 8 parts by weight of an amine base; from about 1.5 to about 4 parts by weight of a hydrolytically-stable polysiloxane-oxyalkylene block copolymer having a molecular weight below about 25,000, a polysiloxane content in the range from about 30 to about 60 percent by weight and being insoluble in water in concentrations greater than one percent at 25° C.; from about 1.5 to about 2 parts by weight of ammonium acetate; from about 0.15 to about 0.25 part by weight of an anionic wetting agent; and water.

References Cited by the Examiner

UNITED STATES PATENTS

| | | | |
|---|---|---|---|
| 2,834,748 | 5/1958 | Bailey et al. | 260—825 |
| 2,846,458 | 8/1958 | Haluska | 260—448.2 |
| 2,917,480 | 12/1959 | Bailey et al. | 260—824 |

LEON J. BERCOVITZ, *Primary Examiner.*

F. McKELVEY, *Assistant Examiner.*